United States Patent 3,185,736
Patented May 25, 1965

3,185,736
1,1-DIARYL-2,2,3,3-TETRAFLUORO-4,4-DIHALOCYCLOBUTANES
Ellsworth K. Ellingboe, Wilmington, Del., assignor to E. I. du Pont de Nemours and Company, Wilmington, Del., a corporation of Delaware
No Drawing. Filed May 31, 1960, Ser. No. 32,514
8 Claims. (Cl. 260—619)

This invention relates to a new class of tetrafluorodihalocyclobutanes, the 1,1-diarylsubstituted-3,3,4,4-tetrafluoro-2,2-dihalocyclobutanes, and has as its principal objects provision of the same and of a method for the preparation thereof.

In the copending, coassigned application of England, Serial No. 32,541 filed herewith (now U.S. Patent No. 3,148,220), it is disclosed that Friedel-Crafts catalysts promote the addition of carbocyclic aromatic hydrocarbons with hydrogen on nuclear carbon across the ring carbonyl double bond of the 3,3,4,4-tetrafluoro-2,2-dihalocyclobutanones. Furthermore, it is also there reported that such aromatic coreactants carrying polar functional groups on nuclear carbon undergo the same reaction without the necessary presence of the Friedel-Crafts catalysts, even though said catalyst in the case of these polar functionally substituted aromatic coreactants make the reaction proceed in better fashion.

It has now been discovered in the case of both such simple unsubstituted aromatic hydrocarbons and such aromatic coreactants carrying the polar functional substituents, both carrying hydrogen on nuclear carbon, that if a significant amount of a strong dehydrating agent is present and the coreactants are charged proportionately, two molar proportions of the organic aromatic coreactants enter into the reaction and form the 1,1-diaryl-substituted 3,3,4,4-tetrafluoro-2,2-dihalocyclobutanes. These 1,1-diaryl-substituted products can thus be prepared directly from two molar proportions of the requisite aromatic coreactant and one molar proportion of the 3,3,4,4-tetrafluoro-2,2-dihalocyclobutanones or the hydrates thereof in the presence of a dehydrating agent.

Alternatively, the 1-aryl-3,3,4,4-tetrafluoro-2,2-dihalocyclobutanols of U.S. Patent No. 3,148,220 can first be prepared from the said aromatic coreactant and the 3,3,4,-4-tetrafluoro-2,2-dihalocyclobutanone in the presence, if necessary, of a Friedel-Crafts catalyst, and subsequently another molar proportion of said aromatic coreactant can then be reacted with the said 1-aryl-3,3,4,4-tetrafluoro-2,2-dihalocyclobutanol in the presence of the requisite dehydrating agent to form the 1,1-diaryl-3,3,4,4-tetrafluoro-2,2-dihalocyclobutanes of the present invention.

The preparative routes and the products are illustrated in further detail by the following equations:

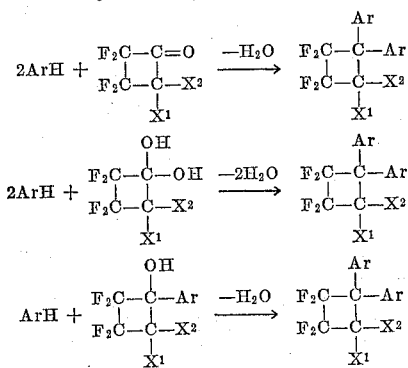

in which Ar is used to represent a monovalent, carbocyclic aromatic radical formed from a nuclear hydrogen-bearing aromatic compound generally of no more than three fused benzene nuclei by removal of said hydrogen, which compound can carry monovalent hydrocarbyl or monovalent functional substituents, both free of acyclic carbon-carbon unsaturation; and $X^1$ and $X^2$ are used to represent halogens of atomic number from 9 to 35, inclusive. Preferably said monovalent hydrocarbyl radicals are of no more than eight carbons each and said monovalent functional substituents are: halogens, including specifically fluorine, chlorine, bromine, and iodine; hydroxy; hydrocarbyloxy; and dihydrocarbylamino, wherein all said hydrocarbyl radicals are of no more than eight carbons each. It will be understood that the two Ar's ($Ar^1$ and $Ar^2$) pendent on ring carbon may be alike or different and the general formula may thus be written as

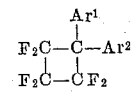

The following examples in which the parts given are by weight are submitted to illustrate the invention further but not to limit it.

Example I

In a glass reactor of internal capacity corresponding to 125 parts of water was charged 4.9 parts of perfluorocyclobutanone hydrate, 5.0 parts of phenol (2.24 molar proportions based on the hydrate), and 2.62 parts of acetic acid. To the resultant mixture was added slowly with stirring 13.8 parts (about 16 molar proportions based on the ketone hydrate) of 96% sulfuric acid over a period of about five minutes. The homogeneous reaction mixture became warm and turned slightly yellow during the addition. After letting stand for about five minutes, during which time the mixture was neither cooled nor heated externally, an excess of ice was added with agitation to dilute the mixture and to absorb the heat of dilution. When the ice had melted, the aqueous mixture contained a crystalline solid which was filtered, washed, and air-dried. There was thus obtained 3.1 parts (35.6% of theory) of crude 2,2,3,3,4,4-hexafluoro-1,1,-di(p-hydroxyphenyl)cyclobutane as white crystals melting at 161–163° C. The product was soluble in diethyl ether, acetone, or dilute aqueous sodium hydroxide and slightly soluble in methylene chloride. The crude product was dissolved in aqueous 5% sodium hydroxide, the solution was filtered to remove insoluble impurities, and the product was reprecipitated by acidification of the filtrate with dilute hydrochloric acid. After filtering, washing, and drying, the purified 2,2,3,3,4,4 - hexafluoro-1,1-di(p-hydroxyphenyl) cyclobutane, which can also be named as 1,1-hexafluorocyclobutylidenebis(p-phenol), was obtained as white crystals melting at 164.5–166.0° C.

Analysis.—Calcd. for $C_{16}H_{10}O_2F_6$: F, 32.8%. Found: F, 32.0%.

Example II

A thick-walled glass reactor approximately 20 diameters long and of internal capacity corresponding to about 150 parts of water was evacuated, cooled in a liquid nitrogen bath, and then charged with a mixture of 13 parts of perfluorocyclobutanone, 22 parts (3.2 molar proportions based on the ketone) of toluene, and 15 parts of phosphorus pentoxide. The reactor was sealed, allowed to warm to room temperature, and finally heated at steam bath temperatures overnight. The reactor was then cooled in a liquid nitrogen bath, opened, and the liquid reaction mixture removed. On distillation, there was thus obtained 9.5 parts (48% of theory) of 2,2,3,3,4,4-hexafluoro-1-(p-tolyl)cyclobutanol—see Example VIII of U.S. Pat. No. 3,148,220—as a clear, colorless liquid boiling at 92° C. under a pressure corresponding to 8 mm. of mercury. On continued distillation, there was obtained 8.6 parts (34% of theory) of 2,2,3,3,4,4-hexafluoro-1,1-di(p-tolyl)cyclobutane as a clear, colorless liquid boiling at 157° C. under a pressure corresponding to 8 mm. of mercury; $n_D^{25}$, 1.4998. The infrared and nuclear magnetic resonance spectra were wholly consistent with the hexafluorodi(p-tolyl)cyclobutane structure.

*Analysis.*—Calcd. for $C_{18}H_{14}F_6$: C, 62.8%; H, 4.1%; F, 33.1%. Found: C, 62.7%; H, 4.1%; F, 32.9%.

Example III

In a glass reactor of internal capacity corresponding to 150 parts of water fitted with a reflux condenser a mixture of 16 parts of the above 2,2,3,3,4,4-hexafluoro-1-(p-tolyl)cyclobutanol, 67 parts (6.6 molar proportions based on the cyclobutanol) of chlorobenzene, and 25 parts of phosphorus pentoxide was refluxed while protected from atmospheric moisture overnight. One hundred parts of water was then added to the reaction mixture which was then extracted with 100 parts of diethyl ether. The ether extract was dried over anhydrous calcium sulfate, and the ether was removed by distillation. Upon continued distillation there was recovered 2.5 parts (15.7% recovery) of the starting hexafluoro-1-(p-tolyl)cyclobutanol and 15.8 parts (73% of theory) of 2,2,3,3,4,4-hexafluoro-1-(p-chlorophenyl)-1-(p-tolyl)cyclobutane as a clear, colorless liquid boiling at 171° C. under a pressure corresponding to eight mm. of mercury; $n_D^{25}$, 1.5104. The infrared and nuclear magnetic resonance spectra were wholly consistent with the hexafluoro-1-(p-chlorophenyl)-1-(p-tolyl)cyclobutane structure.

*Analysis.*—Calcd. for $C_{17}H_{11}F_6Cl$: C, 56.0%; H, 3.0%; F, 31.3%. Found: C, 56.2%; H, 3.4%; F, 31.5%.

Example IV

As in Example III, a mixture of 29 parts of 2,2,3,3,4,4-hexafluoro-1-(p-chlorophenyl)cyclobutanol (see Example IX of U.S. Pat. No. 3,148,220), 56 parts (five molar proportions based on the cyclobutanol) of chlorobenzene, and 28 parts of phosphorus pentoxide was heated at the reflux for 40 hours. One hundred parts of water was then added and the resultant reaction mixture extracted with 100 parts of diethyl ether. The diethyl ether extract was dried over anhydrous calcium sulfate and the ether removed therefrom by distillation. Upon continued distillation, there was recovered six parts (20% recovery) of the starting hexafluoro-1-(p-chlorophenyl)cyclobutanol and 26.5 parts (69% conversion and 87% yield) of 2,2,3,3,4,4-hexafluoro-1,1-di(p-chlorophenyl)cyclobutane as a clear, colorless liquid boiling at 184° C. under a pressure corresponding to 10 mm. of mercury. On standing, the hexafluoro-1,1-di-(p-chlorophenyl)cyclobutane solidified and, upon recrystallization from methanol, was obtained as white crystals melting at 63–64° C. The infrared and nuclear magnetic resonance spectra were wholly consistent with the hexafluoro-1,1-di(p-chlorophenyl)cyclobutane structure.

*Analysis.*—Calcd. for $C_{16}H_8F_6Cl_2$: C, 49.9%; H, 2.1%; F, 29.6%; Cl, 18.4%. Found: C, 49.9%; H, 2.4%; F, 29.8%; Cl, 18.3%.

Example V

As in Example III, a mixture of 20 parts of 2,2,3,3,4,4,-hexafluoro-1-(β-methylnaphthyl)cyclobutanol (see Example X of U.S. Pat. No. 3,148,220), 27 parts (three molar proportions based on the cyclobutanol) of β-methylnaphthalene, and 27 parts of phosphorus pentoxide was heated under anhydrous conditions at steam bath temperatures for 60 hours. One hundred parts of water was then added to the mixture which was then extracted with 100 parts of diethyl ether. The ether extract was dried over anhydrous calcium sulfate and the ether removed by distillation. Continued distillation afforded eight parts (40% recovery) of the starting hexafluoro-1-(β-methylnaphthyl)butanol and 11 parts (40% conversion and 66% yield) of 2,2,3,3,4,4-hexafluoro-1,1-di(β-methylnaphthyl)cyclobutane as a liquid boiling at 195° C. under a pressure corresponding to 1 mm. of mercury. On standing at room temperature, the material set to a glass.

*Analysis.*—Calcd. for $C_{26}H_{18}F_6$: C, 70.3%; H, 4.1%; F, 25.7%. Found: C, 70.9%; H, 4.4%; F, 24.7%.

Example VI

As in Example II, as cylindrical glass reactor was evacuated, cooled in a liquid nitrogen bath, and charged with 29 parts of perfluorocyclobutanone, 30 parts (two molar proportions based on the ketone) of toluene, and two parts of boron trifluoride. The sealed reactor was allowed to stand at room temperature for 60 hours. The reactor was then cooled in a liquid nitrogen bath, opened, and the liquid reaction mixture removed and purified by distillation. There was thus obtained 36 parts (82% of theory) of 2,2,3,3,4,4-hexafluoro-1-(p-tolyl)-cyclobutanol (see Example VIII of U.S. Pat. No. 3,148,220) as a clear, colorless liquid boiling at 108° C. under a pressure corresponding to 20 mm. of mercury. Continued distillation affored 5.2 parts (9% of theory) of 2,2,3,3,4,4-hexafluoro-1,1-di(p-tolyl)-cyclobutane as a clear, colorless liquid boiling at 169° C. under a pressure corresponding to 20 mm. of mercury; $n_D^{25}$, 1.4930.

*Analysis.*—Calcd. for $C_{18}H_{14}F_6$: C, 62.8%; H, 4.1%; F, 33.1%. Found: C, 62.7%; H, 4.1%; F, 32.9%.

Example VII

As in Example II, a cylindrical glass reactor was cooled in a liquid nitrogen bath, evacuated, and charged with a mixture of 36 parts of perfluorocyclobutanone, 30 parts (1.5 molar proportions based on the ketone) of phenol, and six parts (0.45 molar proportion based on the ketone) of boron trifluoride. The reactor was sealed, allowed to warm to room temperature, and heated overnight at steam bath temperatures. The reactor was then cooled in a liquid nitrogen bath, opened, and the solid reaction mixture removed therefrom. On recrystallization from toluene, there was obtained 39 parts (75% of theory) of 2,2,3,3,4,4-hexafluoro - 1,1 - di(p-hydroxyphenyl)cyclobutane as white crystals melting at 158–162.5° C. The product was purified by distillation (boiling point, 180° C., under a pressure corresponding to 2 mm. of mercury). On cooling to room temperature, the resultant solid was recrystallized from toluene to afford white crystals of the pure hexafluoro - 1,1 - di(p - hydroxyphenyl)cyclobutane melting at 163.5–166.0° C.

*Analysis.*—Calcd. for $C_{16}H_{10}F_6O_2$: C, 55.2%; H, 2.9%; F, 32.8%. Found: C, 55.4%; 3.0%; F, 32.6%.

Example VIII

As in Example II, a cylindrical glass reactor was cooled in a liquid nitrogen bath, evacuated, and charged with a mixture of 14 parts of perfluorocyclobutanone, 26.4 parts (4.3 molar proportions based on the ketone) of benzene, and 10 parts (about 2.0 molar proportions based on the ketone) of boron trifluoride. The reactor was sealed, allowed to warm to room temperature, and heated at steam bath temperatures overnight. The reactor was then cooled in a liquid nitrogen bath, opened, and the reaction mixture removed therefrom with the aid of 100 parts of water. The resultant aqueous mixture was separated by distillation. There was thus obtained 17 parts (84% of theory) of 2,2,3,3,4,4-hexafluoro-1-phenyl-cyclobutanol (see Example XIV of U.S. Pat. No. 3,148,220) as a clear, colorless liquid boiling at 84° C. under a pressure corresponding to 15 mm. of mercury; $n_D^{25}$, 1.4328.

The above product was recharged as above into a cylindrical glass reactor, evacuated and cooled in a liquid nitrogen bath, along with an additional 17.6 parts of benzene and 11 parts of boron trifluoride. The reactor was sealed, allowed to warm to room temperature, and then heated at 175° C. for eight hours. The reactor was then cooled in a liquid nitrogen bath and the reaction mixture removed therefrom with the aid of 100 parts of water. The resultant mixture was separated by distillation. There was thus recovered 14.6 parts of the originally charged 2,2,3,3,4,4-hexafluoro-1-phenylcyclobutanol and 1.4 parts (6.7% of theory) of 2,2,3,3,4,4-hexafluoro-1,1-diphenylcyclobutane as a clear, colorless liquid boiling at 130° C. under a pressure corresponding to 15 mm. of mercury; $n_D 25$, 1.4882.

*Analysis.*—Calcd. for $C_{16}H_{10}F_6$: F, 36.1%. Found: F, 37.0%.

Example IX

As in Example III, a glass reactor, fitted with a reflux condenser and drying means, was charged with 10 parts of 1,1'-phenylenebis(hexafluorocyclobutanol), see Example VII of Serial No. 32,541 U.S. Patent No. 3,148,220, 22 parts (10 molar proportions based on the diol) of toluene, and 35 parts of phosphorus pentoxide. The reaction mixture was heated at the reflux for two hours and an additional 22 parts of toluene and 10 parts of phosphorus pentoxide were added. The reaction mixture was heated at the reflux for an additional 20 hours, at which point ten further parts of phosphorus pentoxide was added and the reaction mixture was heated at the reflux for an additional ten hours. The reaction mixture was cooled and added slowly to 200 parts of water. The aqueous reaction mixture was extracted with about 75 parts of diethyl ether. The ether extract was dried over anhydrous magnesium sulfate and the ether removed by distillation. On continued distillation, there was thus obtained 5.5 parts (47% of theory) of 2,2,3,3,4,4-hexafluoro-1-[2',2',3',3',4',4'-hexafluoro - 1' - (p - tolyl)cyclobutylphenyl]cyclobutanol as a clear, colorless liquid boiling at 142° C. under a pressure corresponding to 1 mm. of mercury; $n_D^{25}$, 1.4662.

*Analysis.*—Calcd. for $C_{21}H_{12}F_{12}O$: C, 49.7%; H, 2.4%; F, 44.9%. Found: C, 49.9%; H, 2.8%; F, 44.8%.

Example X

As in Example I, a cylindrical glass reactor was evacuated, cooled in a liquid nitrogen bath, and charged with 15.8 parts of 2,2-dichloro-3,3,4,4-tetrafluorocyclobutanone and 9.4 parts (an equimolar proportion based on the ketone) of phenol. The reactor was sealed, warmed to room temperature, and then heated at steam bath temperatures for 16 hours. The reactor was then cooled in a solid carbon dioxide/acetone bath opened, and the reaction mixture removed. The brownish crystalline mass was extracted with about 330 parts of boiling n-hexane. On cooling the hexane extract to −80° C., a crystalline solid separated which was removed by filtration. There was thus obtained 4.3 parts (19% of theory) of 2,2-dichloro - 3,3,4,4-tetrafluoro-1-(p-hydroxyphenyl)cyclobutanol. After recrystallization from n-hexane, the pure dichlorotetrafluoro-p-hydroxyphenylcyclobutanol was obtained as white crystals melting at 94–95° C. The infrared spectrum was wholly consistent with the dichlorotetrafluorohydroxyphenylcyclobutanol structure.

*Analysis.*—Calcd. for $C_{10}H_6Cl_2F_4O_2$: C, 39.4%; H, 2.0%. Found: C, 39.9%; H, 2.2%.

The residue remaining from the n-hexane extraction was recrystallized from benzene and then from toluene. There was thus obatined 3.8 parts (20% of theory) of 2,2-dichloro - 3,3,4,4-tetrafluoro-1,1-di(p-hydroxyphenyl)cyclobutane as white crystals melting at 169–170° C. The infrared spectrum was wholly consistent with the dichlorotetrafluorodi(p-hydroxyphenyl)cyclobutane structure.

*Analysis.*—Calcd. for $C_{16}H_{10}Cl_2F_4O_2$: F, 20.0%; M.W. 381. Found: F, 20.0%; M.W., 408, 425.

The present invention is generic to the 1,1-diaryl-3,3,4,4-tetrafluoro-2,2-dihalocyclobutanes. The invention is likewise generic to the preparation of these new 1,1-diaromatic-substituted 3,3,4,4 - tetrafluoro-2,2-dihalocyclobutanes from the 3,3,4,4 - tetrafluoro-2,2-dihalocyclobutanones and two molar proportions of the requisite aromatic carbocyclic coreactant bearing hydrogen on at least one nuclear carbon of an aromatic ring in the presence of a dehydrating agent and, if required, a catalyst. The catalyst requirements will differ depending on the degree of reactivity of the hydrogen-bearing aromatic coreactant. Thus, with the more chemically reactive hydrogen-bearing, carbocyclic aromatic coreactants wherein polar, quite chemically reactive substituents are also bonded directly to nuclear carbon, e.g., in the case of phenol, no catalyst is required and the requisite dehydrating agent can be excess molar proportions of the tetrafluorodihalocyclobutanone coreactant. In the case of the less chemically reactive aromatic coreactants, which require the presence of a Friedel-Crafts catalyst to result in the formation of the 1 - aromatic-substituted-3,3,4,4-tetrafluoro-2,2-dihalocyclobutanols, excess proportions of such required Friedel-Crafts catalysts, e.g., phosphorus pentoxide or boron trifluoride, can serve as the requisite dehydrating agent. In any event, the synthesis of the 1,1-diaryl-3,3,4,4-tetrafluoro-2,2-dihalocyclobutanes from the 3,3,4,4-tetrafluoro-2,2-dihalocyclobutanones requires the presence of significant proportions of a dehydrating agent. Generally speaking, this dehydrating agent will be present in no less than molar or ½ molar proportions based on the ketone or ketone hydrate coreactant.

The choice of catalyst and dehydrating agent depend on the substituents present in the aromatic nucleus. No catalyst is required with dimethylaniline or phenol. Phenol reacts with phosphorus pentoxide, so phosphorus pentoxide is a poor choice for a dehydrating agent in this reaction, but boron trifluoride is a good one. Dimethylaniline would react with acidic dehydrating agents so a neutral agent such as calcium or magnesium sulfate would be preferred. Aromatics such as toluene and β-methylnaphthalene require at least a mild catalyst, such as phosphorus pentoxide, and if the phosphorus pentoxide is used in molar proportions, it can also serve as the dehydrating agent in these cases. Phosphorus pentoxide is not a strong enough catalyst for reaction with such compounds as chlorobenzene and diphenyl ether, but aluminum chloride and boron trifluoride are good catalysts. Aluminum chloride should not normally be used as a dehydrating agent because halogen exchange may occur and lead to runaway reactions. Boron trifluoride is both a good catalyst and dehydrating agent even giving some product with benzene itself. Only trace amounts are needed as catalyst, but for dehydration at least an amount equimolar to the cyclobutanone should be used.

The present invention is likewise generic to the preparation of these 1,1-diaryltetrafluorodihalocyclobutanes by the reaction between one molar proportion of the 1-aryl-substituted-3,3,4,4-tetrafluoro-2,2 - dihalocyclobutanols of U.S. Pat. No. 3,148,220 and one molar proportion of the requisite, aromatic, ring-carbon-hydrogen-bearing coreactant, again in the presence of a dehydrating agent. For such a reaction between the cyclobutanol and the aromatic coreactant, the moderately strong dehydrating agents, such as phosphorus pentoxide, magnesium sulfate, boron trifluoride, and the like, will serve adequately. As mentioned above, phosphorus pentoxide should not be used as the dehydrating agent with phenol, nor any acidic dehydrating agent in the presence of an amine. The choice of agent depends on the structures of the coreactants. The amount of reagent should be sufficient to react with the water to be removed.

Finally, the present invention is also generic to the preparation of these new 1,1-diaryl-substituted-3,3,4,4-tetrafluoro-2,2-dihalocyclobutanes by the reaction between a molar proportion of the 3,3,4,4-tetrafluoro-2,2-dihalocyclobutanone hydrates and at least two molar proportions of the requisite aromatic coreactants carrying at least one hydrogen on aromatic ring carbon. In this method of preparation of the new 1,1-diaryltetrafluorodihalocyclobutanes of the present invention, the strongest dehydrating agents will be necessary, such as concentrated sulfuric acid, and the like. The reaction probably proceeds through dehydration of the ketone hydrate to give the ketone, which then reacts with the aromatic compound. Therefore, the choice of catalyst and dehydrating agent must take this into consideration in addition to the other factors mentioned when starting with ketone. In general, this simply requires the use of more of a suitable dehydrating agent.

By virtue of these possible modes of preparation, the first, which involves direct reaction between the tetrafluorodihalocyclobutanone and the requisite aromatic coreactant having hydrogen on ring aromatic carbon, can conveniently result only in the formation of the 1,1-sym.-diaryltetrafluorodihalocyclobutanes. Of course, unsymmetrical 1,1-disubstituted products could presumably be obtained by charging mixtures of the desired aromatic coreactants bearing hydrogen on aromatic ring carbon. However, as is always the case when mixtures are involved, mixtures of products are necessarily obtained. Both of the separate symmetrical disubstituted products, as well as the unsymmetrical disubstituted products, would be obtained, and it would accordingly be difficult to isolate and separate to obtain the pure individual components. The same limitations likewise apply to the last of the three methods just discussed in the preceding sections for the formation of these new 1,1-diaryltetrafluorodihalocyclobutanes for the same reasons.

However, in the second method of preparing these new products, which involves the condensation of one molar proportion of a 1-aryl-substituted-3,3,4,4-tetrafluoro-2,2-dihalocyclobutanol with a molar proportion of the desired aromatic coreactant having hydrogen on aromatic ring carbon in the presence of at least a moderately active dehydrating agent, such limitations do not apply, and, as illustrated in detail in the foregoing examples, the unsymmetrical 1,1-diaryl-substituted products are readily and easily obtained simply by varying the nature of the aromatic coreactants condensed with the 1-aryltetrafluorodihalocyclobutanol from the aromatic coreactant originally reacted with the tetrafluorodihalocyclobutanone to prepare the said 1-aryltetrafluorodihalocyclobutanol starting material.

The reaction is a simple one and requires no complicated operating procedures or equipment. Generally the reaction is carried out in sealed reactors, of which the most convenient are glass or glass-lined reactors. Because of the relatively low boiling nature of some of the 3,3,4,4-tetrafluoro-2,2-dihalocyclobutanones and likewise because of the extreme chemical reactivity of these compounds, e.g., with, for instance, water, and especially with some of the present coreactants, the reaction will generally be carried out by cooling the reactor to liquid nitrogen temperatures or at least to those of solid carbon dioxide (about −80° C.), charging the particular 3,3,4,4-tetrafluoro-2,2-dihalocyclobutanone involved, as well as the aromatic coreactant, purging the reaction vessel with nitrogen, sealing, and allowing the reactor to warm slowly to room temperature. With the higher boiling ketones, the ketone hydrates, and the 1-aryl-3,3,4,4-tetrafluoro-2,2-dihalocyclobutanols, sealed systems are not required and are not normally used, although they may be. The reaction in these instances will simply be carried out under anhydrous conditions. Elevated temperatures up to 150–200° C. can be and sometimes may be used.

The reaction is effected thermally. Depending on the relative reactivity of the tetrafluorodihalocyclobutanones as well as the hydrates thereof, or the 1-aryltetrafluorodihalocyclobutanols and the particular aromatic coreactant involved, the necessary reaction temperatures and reaction times will vary. With the more reactive pairs, the reaction is spontaneous and exothermic, sometimes even at low temperatures. Accordingly, appropriate care should be taken in charging the reactants. Normally temperatures in the range 75–80° C. will suffice for most of the systems. Reaction times will vary from a few minutes to a few hours. In the case of the less reactive systems, higher temperatures and longer reaction times, e.g., up to a few days, will be needed. Temperatures higher than in the range 150–200° C. will normally not be required. Under these conditions, even with the less reactive systems, reaction times required will be, at most, a few hours to a few days. For convenience, an overnight period is frequently used. In those instances wherein the reaction is carried out in a sealed reactor at temperatures above the boiling points of the ketones, the reaction will, of course, be affected at elevated pressures. No externally applied pressure is required. The simple autogenous pressure of the reactants under the temperature conditions used will suffice.

The reaction mixtures are worked up quite simply to obtain the 1,1-diaryltetrafluorodihalocyclobutane products of the present invention. Thus, at the completion of the reaction it is only necessary to open the reactor, distill away any unreacted tetrafluorodihalocyclobutanone-hydrate, -butanol, or aromatic coreactant, and isolate and purify the desired products.

The reaction can be effected properly in the presence or absence of an inert organic reaction medium which, if present, should be anhydrous. Any inert liquid organic diluent can be used, and, generally speaking, the most common are the normally liquid aliphatic and cycloaliphatic hydrocarbons, polyfluorohydrocarbons and ethers, including such aliphatic hydrocarbons as the hexanes, heptanes, octanes, and the like; cycloaliphatic hydrocarbon solvents, such as cyclohexane and the like; aliphatic hydrocarbon ethers, such as dipropyl and dibutyl ethers and the like; the polyfluoroaliphatic hydrocarbons, e.g., 1,1,2,2-tetrafluoro-3,3-dimethylbutane and the like; the polyfluoroaliphatic/cycloaliphatic hydrocarbons, e.g., perfluorodimethylcyclohexane and the like. The choice of the particular diluent if used is not at all critical, and will vary with such other normal variables as the temperature found necessary to effect reaction. In most instances, in order to simplify the reaction, no diluent is used. The requisite tetrafluorodihalocyclobutanone and aromatic coreactants are simply mixed and heated together as described previously and the product isolated therefrom after the reaction has been completed. The absence of a diluent generally makes separation of unreacted material and the desired products easier.

From the foregoing, it is apparent that in preparing these new 1,1-diaryltetrafluorodihalocyclobutane products, there can be used any 3,3,4,4-tetrafluoro-2,2-dihalocyclobutanone where the two halogen substituents are of atomic number from 9 to 35, inclusive, i.e., fluorine, chlorine, and bromine, alike or different. More specifically, there can be used perfluorocyclobutanone, 2-chloro-2,3,3,4,4-pentafluorocyclobutanone, 2-bromo-2,3,3,4,4-pentafluorocyclobutanone, 2-bromo-2-chloro-3,3,4,4-tetrafluorocyclobutanone, 2,2-dichloro-3,3,4,4-tetrafluorocyclobutanone, and 2,2-dibromo-3,3,4,4-tetrafluorocyclobutanone.

Of these polyfluorocyclobutanones, various chlorofluorocyclobutanones have been disclosed in U.S. Patents 2,712,554 and -5, although no detailed method for the preparation thereof is given. Perfluorocyclobutanone is described and claimed in U.S. Pat. No. 3,039,995. All of these polyfluoroperhalocyclobutanones can be readily prepared by the cyclo-addition reaction between perfluorovinyl hydrocarbyl ethers with the requisite 1,1-dihalo-2,2-difluoroethylenes, followed by hydrolysis of the resultant 1 - hydrocarbyloxy - 1,3,3,4,4-pentafluoro-2,2-dihalocyclobutanes, all as disclosed and claimed in detail in the above-referred to Patent 3,039,995. These cyclobutanones are generally gaseous to liquid, depending on the total molecular weight which varies with the halogens quite reactive materials which preferably should be handled under anhydrous conditions.

As illustrated in the foregoing examples, these new 3,3,4,4-tetrafluoro-2,2-dihalo-1,1-diaryl-substituted cyclobutanes, in addition to being preparable directly from the requisite tetrafluorodihalocyclobutanone and two molar proportions of the requisite aromatic coreactant carrying hydrogen on nuclear carbon in the presence of the necessary dehydrating agent, can also be prepared in similar fashion from the 1-aryl-substituted-3,3,4,4-tetrafluoro-2,2-dihalo-1-cyclobutanols of the U.S. Pat. No. 3,148,220, again the requisite carbocyclic aromatic coreactant carrying hydrogen on at least one nuclear carbon, and the necessary dehydrating agent. Actually while it is not intended that the invention be in any way thereby limited, it is believed that in the reaction between the tetrafluorodihalocyclobutanones and the nuclear hydrogen-bearing aromatic coreactant in the presence of the necessary dehydrating agent the reaction first proceeds to the formation of the 1-aryl-substituted tetrafluorodihalocyclobutanols with subsequent reaction thereof with additional quantities of the nuclear hydrogen-bearing aromatic coreactant to form the 1,1-diaryl-substituted-3,3,4,4-tetrafluoro-2,2-dihalocyclobutanes of the present invention.

As the coreactants with the just-described tetrafluorodihalocyclobutanones to make the new 1,1-diaryltetrafluorodihalocyclobutanes, or as the coreactants with the tetrafluorodihalocyclobutanone hydrates, or as the coreactants with the 1-aryl-3,3,4,4-tetrafluoro-2,2-dihalocyclobutanols, there can be used any aromatic coreactant having at least one hydrogen on aromatic carbon and free of acyclic carbon-carbon unsaturation. Generally the aromatic coreactant will contain no acyclic carbon-carbon double bonds, i.e., will be aliphatically saturated and will contain no more than three fused aromatic nuclei. In addition to the required at least one hydrogen on nuclear carbon of the aromatic coreactant, the remaining nuclear carbons thereof can carry hydrogen or one or more hydrocarbyl, halogen, including expressly fluorine, chlorine, bromine, and iodine, hydroxy, hydrocarbyloxy, and dihydrocarbylamino radicals, all free of acyclic carbon-carbon double bonds, i.e., all being aliphatically saturated, and all hydrocarbyl portions being of no more than eight carbons each. Thus, there can be used in the preparation of the new 1,1-diaryl-3,3,4,4-tetrafluoro-2,2-dihalocyclobutanes such aromatic coreactants carrying at least one hydrogen on nuclear carbon thereof as: fluorobenzene, o-dichlorobenzene, bromonaphthalene, iodobenzene, m-dihydroxybenzene, n-octyloxybenzene, di-n-octylaminobenzene, n-octylanthracene, p-chlorophenol, and p-methoxyphenol.

Using the reaction conditions outlined in the foregoing, there will be obtained from the specific 3,3,4,4-tetrafluoro-2,2-dihalocyclobutanones and the aromatic coreactants just discussed generically and illustrated with suitable specific examples additional 1,1-diaryl-3,3,4,4-tetrafluoro-2,2-dihalocyclobutanes of the present invention. Similarly, the 1,1-diaryl-3,3,4,4-tetrafluoro-2,2-dihalocyclobutanes of the present invention can also be prepared from the same aromatic coreactants and the ketone hydrates or the 1-aryl-substituted-3,3,4,4-tetrafluoro-2,2-dihalocyclobutanols. More specifically, from two molar proportions of fluorobenzene and one molar proportion of perfluorocyclobutanone in the presence of molar proportions of $P_2O_5$ there will be obtained 2,2,3,3,4,4-hexafluoro-1,1-di(p-fluorophenyl)cyclobutane. From two molar proportions of o-dichlorobenzene and one molar proportion of 2-chloro-2,3,3,4,4-pentafluorocyclobutanone and molar proportions of $P_2O_5$ there will be obtained 2-chloro-2,3,3,4,4-pentafluoro-1,1-di(3,5-dichlorophenyl)cyclobutane. From two molar proportions of bromonaphthalene and one molar proportion of 2,2-dichloro-3,3,4,4-tetrafluorocyclobutanone and molar proportions of $BF_3$ there will be obtained 2,2-dichloro-3,3,4,4-tetrafluoro-1,1-di(5-bromonaphthyl)cyclobutane. From two molar proportions of iodobenzene and one molar proportion of 2-bromo-2,3,3,4,4-pentafluorocyclobutanone and molar proportions of $BF_3$ there will be obtained 2-bromo-2,3,3,4,4-pentafluoro-1,1-di(p-iodophenyl)cyclobutane.

Further, from two molar proportions of m-dihydroxybenzene and one molar proportion of 2,2-dibromo-3,3,4,4-tetrafluorocyclobutanone and molar proportions of $P_2O_5$ there will be obtained 2,2-dibromo-3,3,4,4-tetrafluoro-1,1-di(3,5-dihydroxyphenyl)cyclobutane. From two molar proportions of n-octyloxybenzene, i.e., octyl phenyl ether, and one molar proportion of 2-bromo-2-chloro-3,3,4,4-tetrafluorocyclobutanone there will be obtained 2-bromo-2-chloro-3,3,4,4-tetrafluoro-1,1-di(p-octyloxyphenyl)cyclobutane. From two molar proportions of N,N-di-n-octylaminobenzene and one molar proportion of perfluorocyclobutanone and molar proportions of aluminum chloride there will be obtained 2,2,3,3,4,4-hexafluoro-1,1-di(p-dioctylaminophenyl)cyclobutane. From two molar proportions of n-octylanthracene and one molar proportion of perfluorocyclobutanone and molar proportions of $BF_3$ there will be obtained 2,2,3,3,4,4-hexafluoro-1,1-di(6-octylanthryl)cyclobutane. From two molar proportions of p-chlorophenol and one molar proportion of 2,2-dichloro-3,3,4,4-tetrafluorocyclobutanone and molar proportions of $P_2O_5$ there will be obtained 2,2-dichloro-3,3,4,4-tetrafluoro-1,1-di(2-hydroxy-5-chlorophenyl)cyclobutane. From two molar proportions of p-methoxyphenol and one molar proportion of 2-chloro-2,3,3,4,4-pentafluorocyclobutanone and molar proportions of $P_2O_5$ there will be obtained 2-chloro-2,3,3,4,4-pentafluoro-1,1-di(2-hydroxy-5-methoxyphenyl)cyclobutane. The same products will be obtained from the same aromatic coreactants and molar proportions of the hydrates of the same tetrafluoro-2,2-dihalocyclobutanones and excess quantities of strong dehydrating agents, such as concentrated sulfuric acid.

While in the foregoing the specific stoichiometry required has uniformly called for two molar proportions of the aromatic coreactant, this is not necessarily required. For maximum yield of the dehydrated 2:1 aromatic:cyclobutanone products, the stoichiometry obviously requires that there be at least two molar proportions of the aromatic coreactant. Following normal chemical procedures, excesses of this reaction past the two molar proportions called for in the stoichiometry can be and frequently will be used to drive the reaction as far as possible toward the formation of the desired 2:1 dehydration product. However, as is true in all chemistry, some of the 2:1 dehydration products will be obtained when less than two molar proportions of the aromatic coreactants are charged with the tetrafluorodihalocyclobutanones.

These new 1,1-diaryl-substituted tetrafluorodihalocyclobutanes are generically useful as solvents for highly fluorinated polymers, for instance, the polyfluorinated olefins or more precisely the polymers of polyfluorinated olefins. Solutions of such polymers, e.g., polytetrafluoroethylene, polychlorotrifluoroethylene, and the like, in these substituted cyclobutanes are readily obtained by heating the polymers at approximately 1-20% weight concentration in the diaryl-substituted tetrafluorodihalocyclobutanes, conveniently at the reflux. Such solutions are useful in rendering water-proof and water repellent such shaped objects of cellulose as paper, wood, and the like, as well as in forming films and fibers and other shaped products of the polyfluorinated olefin polymers. In addition to their excellent waterproofing and water repellent-rendering properties, solutions of these polyfluorinated olefin polymers are also useful in rendering such shaped objects of cellulose non-supportive of combustion or markedly decreasing the tendency such materials normally have for burning. More specifically:

Example A

An approximately 20% by weight solution of a low molecular weight, relatively low melting tetrafluoroethylene polymer (melting range, 83–150° C.) in the 2,2,3,3,4,4-hexafluoro-1,1-di(p-hydroxyphenyl)cyclobutane of Example I was prepared by heating the polymer in the cyclobutane at the reflux. Strips of filter paper were immersed in the hot solution, removed, and the cyclobutane solvent completely removed therefrom by treatment with acetone. The thus treated strips were then dried, and on testing it was found that the treated strips were water repellent and somewhat resistant to burning. In contrast, of course, untreated control strips of the same filter paper were rapidly and completely wet on contact with water and, furthermore, burned rapidly when subjected to a flame.

The same results were obtained using the 2,2,3,3,4,4-hexafluoro-1,1-di(p-tolyl)cyclobutane of Example II, the 2,2,3,3,4,4-hexafluoro-1-(p-chlorophenyl) - 1 - (p-tolyl)-cyclobutane of Example III, the 2,2,3,3,4,4-hexafluoro-1,1-di(p-chlorophenyl)cyclobutane of Example IV, the 2,2,3,3,4,4-hexafluoro - 1,1 - di(β-methylnaphthyl)cyclobutane of Example V and the 2,2,3,3,4,4-hexafluoro-1,1-diphenylcyclobutane of Example VIII.

Since obvious modifications and equivalents in the invention will be evident to those skilled in the chemical arts I propose to be bound solely by the appended claims.

The embodiments of the invention in which an exclusive property or privilege is claimed are defined as follows:

1. A compound of the formula

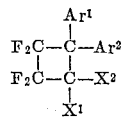

wherein $Ar^1$ and $Ar^2$ are monovalent, carbocyclic, aromatic radicals of up to three fused benzene nuclei, any substituents on said nuclei being selected from the group consisting of hydrocarbyl, hydrocarbyloxy, and dihydrocarbylamino of up to 8 carbons free of acyclic carbon-carbon unsaturation, halogen and hydroxyl and $X^1$ and $X^2$ are halogen of atomic number 9–35.

2. 2,2,3,3,4,4 - hexafluoro - 1,1 - di(p-hydroxyphenyl)cyclobutane.
3. 2,2,3,3,4,4-hexafluoro-1,1-di(p-tolyl)cyclobutane.
4. 2,2,3,3,4,4 - hexafluoro - 1 - (p-chlorophenyl) - 1-(p-tolyl)cyclobutane.
5. 2,2,3,3,4,4 - hexafluoro-1,1-di(p-chlorophenyl)cyclobutane.
6. 2,2,3,3,4,4 - hexafluoro - 1,1 - di(β - methylnaphthyl)cyclobutane.
7. 2,2 - dichloro - 3,3,4,4 - tetrafluoro - 1,1 - di(p-hydroxyphenyl)cyclobutane.
8. 2,2,3,3,4,4-hexafluoro-1,1-diphenylcyclobutane.

References Cited by the Examiner
UNITED STATES PATENTS

| | | | |
|---|---|---|---|
| 2,069,573 | 2/37 | Bolton | 260—619 |
| 2,436,142 | 2/48 | Harmon | 260—648 |
| 2,462,345 | 2/49 | Barrick | 260—648 |
| 2,721,882 | 10/55 | Schmerling | 260—612 |
| 2,733,278 | 1/56 | Anderson | 260—651 XR |
| 2,744,941 | 5/56 | Hartle et al. | 260—651 |
| 2,782,238 | 2/57 | Bluestone et al. | 260—612 |
| 2,874,197 | 2/59 | Dixon | 260—651 |
| 2,883,365 | 4/59 | Mathes | 260—619 |

LEON ZITVER, *Primary Examiner.*
CHARLES B. PARKER, HAROLD G. MOORE,
*Examiners.*